United States Patent
Ishikawa et al.

(10) Patent No.: US 6,951,677 B2
(45) Date of Patent: *Oct. 4, 2005

(54) LAMINATE WITH A PEELABLE TOP LAYER AND METHOD OF PEELING OFF THE TOP LAYER FROM THE LAMINATE

(75) Inventors: Hiroyuki Ishikawa, Nara (JP); Sumiya Shimotsuma, Kawachinagano (JP); Shinichiro Matsushita, Osaka (JP); Keiichi Hamada, Nishinomiya (JP)

(73) Assignees: Matsushita Electric Works, Ltd., Osaka (JP); Konishi Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,735

(22) Filed: Jul. 8, 2004

(65) Prior Publication Data

US 2005/0003131 A1 Jan. 6, 2005

Related U.S. Application Data

(62) Division of application No. 09/982,782, filed on Oct. 22, 2001.

(30) Foreign Application Priority Data

Oct. 23, 2000 (JP) ........................................ 2000-323254
Oct. 23, 2000 (JP) ........................................ 2000-323255

(51) Int. Cl.$^7$ .............................. B32B 5/16; C08J 3/00; C09J 7/02
(52) U.S. Cl. .................... 428/40.9; 428/40.1; 428/40.2; 428/43; 428/67; 428/304.4; 428/306.6; 428/308.4; 428/313.3; 428/313.5; 428/315.9; 52/309.1
(58) Field of Search ................................ 428/40.1–42.3, 428/43, 67, 304.4, 306.6, 308.4, 308.8, 313.3, 313.5, 315.9, 343; 52/309.1–309.17

(56) References Cited

U.S. PATENT DOCUMENTS

| 4,855,170 A | 8/1989 | Darvell et al. ............. 428/40.2 |
| 5,240,989 A | 8/1993 | Bernard et al. ............. 524/560 |

FOREIGN PATENT DOCUMENTS

| JP | 56-61468 | 5/1981 |
| JP | 9-194811 | 7/1997 |
| JP | 2000-169808 | 6/2000 |
| WO | WO 98/50480 | 11/1998 |

*Primary Examiner*—Harold Pyon
*Assistant Examiner*—Patricia L. Nordmeyer
(74) *Attorney, Agent, or Firm*—Oblon, Spivak, McClelland, Maier & Neustadt, P.C.

(57) ABSTRACT

A laminate with a peelable top layer is provided. The laminate comprises a substrate such as a porous board, the top layer such as a plastic top layer or a decorated metal plate, and a bonding layer between the top layer and the substrate. At least one of the substrate and the top layer is porous. An adhesive for forming the bonding layer comprises (A) an aqueous dispersion containing a polymer, which demonstrates properties that a dried film of the aqueous dispersion has a tensile strength of 1 to 28 MPa and a percentage elongation of 100 to 2000%, and (B) a water-based adhesive composition containing microspheres with thermal expansion capability, each of which is composed of a polymer shell encapsulating a gas. By use of this adhesive, the bonding layer provides a high bonding strength between the top layer and the substrate. When irradiating the laminate with ultraviolet or far infrared, while heating, the top layer can be easily peeled off from the laminate.

17 Claims, No Drawings

LAMINATE WITH A PEELABLE TOP LAYER AND METHOD OF PEELING OFF THE TOP LAYER FROM THE LAMINATE

This is a divisional application of U.S. application Ser. No. 09/982,782, filed on Oct. 22, 2001, now allowed.

BACKGROUND OF THE INVENTION

1. Field of the Invention

The present invention relates to a laminate with a peelable top layer, which can be used as building materials that survive severe use conditions for an extended time, and be easily recycled after use, and a method of peeling off the top layer from the laminate for the recycling.

2. Disclosure of the Prior Art

In the past, laminated boards have been widely used in many application fields, for example, as building materials for office, condominium and house, materials for interior decoration, and car interiors. The laminated boards are usually produced by bonding a substrate such as a wooden board or a plasterboard with a decorated plastic sheet, for example, a polyvinyl chloride, polyester or polyolefin sheet having a printed pattern such as grain of wood, or a decorated metal plate, for example, a paint coated metal plate, steel plate having an anti-corrosive surface obtained by a phosphate treatment, or an aluminum plate with an anodic oxidation coating.

However, when performing repair or demolition in the above-described applications, it is desired to peel off the metal or plastic sheet from the laminated board. If the metal or plastic sheet cannot be easily peeled off, all of the laminated board must be disposed as industrial waste. In recent years, the influence that the industrial waste gives to environment becomes an object of public concern. Therefore, it is tried to improve easiness of peeling the metal or plastic sheet, and the easiness of recycling or reusing the laminated board after use.

For example, Japanese Patent Early Publication [KOKAI] No. 56-61468 discloses a peelable adhesive, which is characterized by containing 30 to 100 parts by weight of microspheres having the capability of volume expansion by heating with respect to 100 parts by weight of an adhesive component. By use of this adhesive, there are advantages that an operation of peeling labels from labeled bottles after use or of tearing off an unnecessary seal from a purchased article becomes easy.

However, in the building-materials field, a very high bonding strength between the metal or plastic sheet and the substrate is needed, as compared with the above-described cases. In particular, when producing the laminated board with use of a specific plastic sheet such as polyester or polyolefin that has the difficulty to adhesion, it is necessary for the laminated board to demonstrate excellent performance in water resistance, heat resistance, heat creep resistance, and resistance to hot water, in addition to the high bonding strength.

In these circumstances, it is waited to develop a laminated board having improved easiness of peeling the plastic sheet or the metal plate, i.e., the easiness of recycling or reusing the laminated board after use, while providing excellent bonding performance of the laminated board that can survive severe use conditions for an extended time.

SUMMARY OF THE INVENTION

Therefore, a primary object of the present invention is to provide a laminate with a peelable top layer, which can be used as building materials that have the capability of surviving severe use conditions, and be easily recycled after use.

That is, the laminate of the present invention comprises a substrate, the top layer, and a bonding layer between the top layer and the substrate. At least one of the substrate and the top layer is porous. An adhesive for forming the bonding layer comprises (A) an aqueous dispersion containing a polymer, which has properties that a dried film of the aqueous dispersion has a tensile strength of 1 to 28 MPa and a percentage elongation of 100 to 2000%, and (B) a water-based adhesive composition containing microspheres with thermal expansion capability, each of which is composed of a polymer shell encapsulating a gas.

Since the aqueous dispersion (A) with the above properties is contained in the adhesive, it is possible to provide the bonding layer having excellent bonding performance between the top layer and the substrate, without deteriorating the thermal expansion capability of the microspheres of the water-based adhesive composition (B). In addition, to remove water contained in the adhesive on the lamination process, at least one of the substrate and the top layer is porous.

In a preferred embodiment of the present invention, the top layer is a plastic top layer or a decorated metal plate, and the substrate is a porous board.

It is preferred that the aqueous dispersion (A) contains an ethylene-vinyl acetate copolymer (EVAc), and particularly an anionic polyurethane dispersion in addition to the ethylene-vinyl acetate copolymer. In the later case, it is preferred to use an anionic polyurethane dispersion with sulfonate groups as the anionic polyurethane dispersion.

A further object of the present invention is to provide a method of peeling off the top layer from the laminate described above. That is, the method is characterized by comprising the step of irradiating the laminate with a light, while carrying out a heating process to the laminate.

By heating the laminate after use, a dramatic increase in volume of the microspheres is caused in the bonding layer. This volume expansion of the bonding layer facilitates the easiness of peeling the top layer to a certain extent. However, as the temperature of the laminate decreases, the easiness of peeling gradually deteriorates because the bonding strength is recovered by shrinkage of the microspheres. In addition, it is hard for workers to carry out the peeling operation of the laminate at the high temperature for a long time. Moreover, prolonged heating may alter the quality of the laminate, or cause a deformation of the laminate. These are still problems for recycling of the laminate.

In the present invention, it is found that the easiness of peeling the top layer can be remarkably improved by irradiating the laminate with the light, preferably far infrared or ultraviolet, while heating the laminate. In particular, when using far infrared having a wavelength of 5 to 30 $\mu$m, the top layer can be easily peeled off in a short time, for example, several minutes. In addition, it is possible to prevent adhesion of a residue of the bonding layer to the peeled top layer. Moreover, when the laminate is irradiated for 2 minutes or more with the far infrared, while being heated at a temperature of 150° C. or more, there is a further advantage that the top layer can peel off by itself after the irradiation.

These and still other objects and advantages will become apparent from the following detail description of the invention and preferred examples of the invention.

DETAIL DESCRIPTION OF THE PRESENT INVENTION

As described above, the laminate of the present invention is composed of the substrate, the peelable top layer, and the bonding layer between the top layer and the substrate.

As the substrate of the laminate, for example, it is possible to use a porous board comprising a wooden board such as medium density fiberboard (MDF), particle board, and veneer, an inorganic material board such as plasterboard, noninflammable board, and autoclaved-lightweight-concrete board (ALC), and a porous plastic board such as foamed polyurethane board and foamed FRP board.

A metal plate or board can be used as the peelable top layer of the laminate. In this case, as the metal plate or board, for example, it is possible to use a decorated steel or metal plate or board with a polymer-paint coating, steel plate or board with a phosphate-treatment surface, or an aluminum plate or board with an anodic-oxidation coating. As the steel or metal plate or board with the polymer-paint coating, for example, epoxy resin-coated steel or metal plates or boards, and PVC-coated steel or metal plates or boards are well known.

In addition, a plastic sheet can be used as the top layer of the laminate. In this case, as the plastic sheet, for example, it is possible to use a polyolefin sheet such as a polypropylene sheet having a corona-discharge treatment surface, polyester film, acrylic film, melamine-formaldehyde resin sheet or the like. A plastic sheet with decoration may be used as the material for the top layer.

The adhesive used to form the bonding layer between the top layer and the substrate of the laminate of the present invention comprises an aqueous dispersion (A) containing a polymer, and a water-based adhesive composition (B) containing microspheres with thermal expansion capability, each of which is composed of a polymer shell encapsulating a gas.

In the present invention, it is important that a dried film of the aqueous dispersion (A) demonstrates a tensile strength of 1 to 28 MPa and a percentage elongation of 100 to 2000%. When the tensile strength is less than 1 MPa, a sufficient bonding strength between the top layer and the substrate cannot be obtained. When the tensile strength is more than 28 MPa, there is a problem that the performance of the microspheres having thermal expansion capability in the bonding layer is inhibited. That is, the microspheres are uniformly dispersed in the bonding layer obtained by drying the adhesive. When heating the laminate for an extended time, or preferably irradiating ultraviolet or far infrared to the laminate while heating, each of the microspheres in the bonding layer dramatically expands to enhance the easiness of peeling the top layer from the laminate. Therefore, too large a tensile strength of the dried film of the aqueous dispersion (A) leads to a reduction in the expansion performance of the microspheres in the bonding layer.

On the other hand, when the percentage elongation is less than 100%, there is the problem that the performance of the microspheres having thermal expansion capability in the bonding layer is inhibited. When the percentage elongation is more than 2000%, it becomes difficult to maintain sufficient bonding performance in practical use of the laminate. To achieve the expansion performance of the microspheres at maximum, while maintaining the excellent bonding performance sufficient to survive severe use conditions, it is particularly preferred that the dried film of the aqueous dispersion (A) demonstrates a tensile strength of 3 to 15 MPa and a percentage elongation of 200 to 1500%. If necessary, the aqueous dispersion (A) may contain a softening agent such as a plasticizer, and/or a reinforcing agent such as an inorganic fillers like a clay, talk, and so on.

The dried film of the aqueous dispersion (A) can be obtained by uniformly applying the aqueous dispersion on a sheet such as a release paper, and leaving the applied film at 23° C. for 7 days under an air-drying condition or a natural-drying condition. To evaluate the properties of the dried film, the dried film having a thickness of approximately 0.15 mm, and a shape of Type No. 3 set forth in the JIS (Japanese Industrial Standard) K 6251 is preferably used. The tensile strength of the dried film means a maximum failure strength determined at the tensile speed of 500 mm/min at room temperature (23° C.). The percentage elongation can be determined from a maximum elongation of the dried film at the failure. These properties of the dried film of the aqueous dispersion (A) are determined in the absence of the water-based adhesive composition (B) containing the microspheres having thermal expansion capability.

It is preferred that the aqueous dispersion (A) contains at least one selected from the group consisting of vinyl acetate polymer or copolymer, urethane polymer, acrylic polymer or copolymer, silicone polymer, chloroprene elastomer, and styrene-butadiene elastomer. As the vinyl acetate polymer or copolymer, for example, it is possible to use polyvinyl acetate homopolymer, ethylene-vinyl acetate copolymer (EVAc), ethylene-vinyl acetate-acrylic ester copolymer, or vinyl acetate-acrylic ester copolymer. As the acrylic polymer or copolymer, for example, it is possible to use (meth)acrylate ester copolymer, or (meth)acrylate ester-styrene copolymer. As the silicone polymer, it is preferred to use a silicone polymer, which can be dispersed in water. For example, it is possible to use a silicone polymer having an organosilane structure or a modified silicone polymer having a polyoxypropylene structure.

In the present invention, as the aqueous dispersion (A), it is particularly preferred to use an ethylene-vinyl acetate copolymer (EVAc) emulsion, or a mixture of the EVAc emulsion and an anionic polyurethane dispersion. In this case, the laminate of the present invention is excellent in compatibility with the existing production line in building materials factory and so on. In addition, it is possible to provide the laminate having excellent in water resistance, heat resistance, bonding performance of the top layer in practical use, and improved easiness of peeling the top layer.

The EVAc emulsion is a polymer emulsion obtained by copolymerization of an ethylene monomer and a vinyl acetate monomer, or by copolymerization of an ethylene monomer, a vinyl acetate monomer, and small amount of multifunctional monomer. It is preferred that the copolymerization ratio of ethylene/vinyl acetate (weight ratio) is in a range of 5~35/95~65, and more preferably 10~30/90~70. The range of 10~30/90~70 of the copolymerization ratio is effective to obtain well-balanced performance in bonding strength, water resistance, heat resistance, heat creep resistance, resistance to hot water, and the capability of following volume expansion of the microspheres.

The EVAc emulsion can be obtained by emulsion polymerization under high pressure condition in the presence of at least one of a surface-active agent and water-soluble polymers such as polyvinyl alcohol, or hydroxyethyl cellulose. To achieve good compatibility with the existing production line, and obtain uniform dispersion of the microspheres in the adhesive, it is preferred that the ethylene-vinyl acetate copolymer contains polyvinyl alcohol. As a preferred example, the EVAc emulsion contains 2 to 6 wt % of polyvinyl alcohol, and a weight ratio of ethylene/vinyl acetate is within the range of 15 to 30/85 to 70.

In addition, it is preferred that a toluene insoluble fraction of the dried film of the ethylene-vinyl acetate copolymer (EVAc) emulsion is 70 wt % or more, and particularly 85 wt % or more. In the above range of the toluene insoluble fraction, it is possible to provide excellent heat creep resistance of the laminate and easiness of peeling the top layer. This toluene insoluble fraction is given by the expression:

$$\text{Toluene insoluble fraction } T \text{ (wt \%)} = (W2/W1) \times 100,$$

wherein "W2" is a weight of insoluble matter of the dried film, which can be determined by extracting soluble matter from 2.0 g of the dried film at 60° C. for 24 hours by use of 200 ml of toluene, and measuring a weight of the insoluble matter of the dried film after the extraction, and "W1" is a weight (=2.0 g) of the dried film measured before the extraction.

For example, the ethylene-vinyl acetate copolymer (EVAc) emulsion having the toluene insoluble fraction of 70 wt % or more can be prepared by use of the multifunctional monomer in combination with ethylene monomer and vinyl acetate monomer. The multifunctional monomer is a monomer that can give two or more double bonds (C=C bond) as the component of the copolymer. For example, it is possible to use triallyl cyanurate, triallyl isocyanurate and diallyl phthalate.

In the case of using the copolymer of polyvinyl alcohol containing ethylene-vinyl acetate-multifunctional monomer, which has the toluene insoluble fraction of 70 wt % or more, it is preferred that a weight ratio of ethylene/vinyl acetate is within a range of 5 to 30/95 to 70, and particularly 10 to 30/90 to 70, to obtain good performance in film-formability of the adhesive, flexibility of the formed film, and heat resistance of the adhesive. It is also preferred that a weight ratio of multifunctional monomer/vinyl acetate is within a range of 0.05 to 0.4/100, and particularly 0.1 to 0.2/100. Moreover, it is preferred that the content of polyvinyl alcohol is within the range of 1 to 10 wt %, and particularly 3 to 8 wt % with respect to the total polymer used. In this case, it is possible to provide excellent adhesion to the plastic sheet used as the top layer.

It is preferred that a concentration of solid content in the copolymer of the polyvinyl alcohol containing ethylene-vinyl acetate-multifunctional monomer, which has the toluene insoluble fraction of 70 wt % or more, is within the range of 40 to 70 wt % and particularly 45 to 65 wt %. In this range, it is possible to further improve easiness of bonding, mechanical stability of the bonding layer, and green strength at the initial stage of lamination.

When preparing the copolymer of the polyvinyl alcohol containing ethylene-vinyl acetate-multifunctional monomer, which has the toluene insoluble fraction of 70 wt % or more, the other monomer may be added for the copolymerization, if necessary. As the other monomer, for example, it is possible to use acrylic acid, an acrylic ester such as ethylhexyl acrylate, butyl acrylate, or an ethyl acrylate, a (meth)acrylate ester such as butyl (meth)acrylate or ethyl (meth)acrylate, a monomer containing carboxyl group other than (meth)acrylate, sulfonic acid, or a monomer containing a functional group such as hydroxyl group, epoxy group, methylol group, amino group and amide group.

The EVAc emulsion having the toluene insoluble fraction of 70 wt % or more can be also prepared by a production method disclosed in Japanese Patent Early Publication No. 9-194811.

On the other hand, the anionic polyurethane dispersion is a polyurethane dispersion having anion charges in the molecule. As the anionic polyurethane dispersion, it is preferred to use an anionic polyurethane dispersion with sulfonate groups. The anionic polyurethane polymer with sulfonate groups is a urethane polymer having sulfonate groups in the molecule, which is usually emulsion-stabilized as a sulfonate. The adhesive containing the anionic polyurethane dispersion with sulfonate groups is effective to prevent reductions in water resistance and bonding performance of the adhesive caused by formulating the aqueous dispersion (A) with the microspheres having thermal expansion capability. In particular, the adhesive is excellent in adhesion to the plastic sheet and provides heat creep resistance.

It is preferred that a concentration of solid content in the anionic polyurethane dispersion with sulfonate groups is within the range of 20 to 60 wt %, and particularly 35 to 55 wt %, to obtain improved performance in easiness of applying the adhesive, and mechanical stability of the bonding layer. In addition, as the anionic polyurethane dispersion with sulfonate groups, it is preferred to use an aromatic anionic polyurethane dispersion having polyester structure and sulfonate groups.

As the anionic polyurethane dispersion with sulfonate groups, for example, it is possible to use UPRENE UXA-3005 or UX-306 (manufactured by SANYO CHEMICAL Co., Ltd.), ECOS-1000S or ECOS1000H (manufactured by DAINIPPON INK AND CHEMICALS, INCORPORATED), or SUPERFLEX 410, 700, 750 (manufactured by DAI-ICHI KOGYO SEIYAKU Co,. Ltd).

In case of using a mixture of the EVAc emulsion having the toluene insoluble fraction of 70 wt % or more, and an anionic polyurethane dispersion with sulfonate groups, as the water dispersion (A), it is possible to minimize the reductions in water resistance and bonding performance of the adhesive caused by mixing the water dispersion (A) with the microspheres having thermal expansion capability. In addition, it is possible to prevent a reduction in water resistance of the bonding layer caused by the presence of the microspheres in the bonding layer.

As to the compounding amount of the anionic polyurethane dispersion with sulfonate groups relative to the copolymer of polyvinyl alcohol containing ethylene-vinyl acetate-multifunctional monomer, which has the toluene insoluble fraction of 70 wt % or more, it is preferred that the compounding amount (solid content) of the anionic polyurethane dispersion is within a range of 2 to 50 parts by weight, and particularly 3 to 40 parts by weight with respect to 100 parts by weight (solid content) of the copolymer. In this range, it is possible to obtain better performance in heat creep resistance and bonding strength under normal use conditions. In addition, there is an advantage that the top layer can be efficiently bonded to the substrate. This provides an improvement in cost/performance of the laminate.

In addition to the water dispersion (A), the water-based adhesive composition (B) containing the microspheres with thermal expansion capability, each of which consists of a polymer shell encapsulating a gas, is an essential component of the adhesive of the present invention. This adhesive composition (B) is an important to provide the easiness of peeling the top layer (easiness of recycling or reusing after use). That is, when the microspheres are heated, the internal gas pressure of the respective polymer shell increases. In addition, since the polymer shell softened by heating, the increase in the internal pressure of the polymer shell leads to a dramatic increase in volume of the microspheres. By the aid of this dramatic volume increase in the bonding layer, the top layer can be easily peeled off from the laminate.

It is preferred that an expanding magnification of the microspheres is with in a range of 20 times to 100 times, and an expanding start temperature of the microspheres is within a range of 90° C. to 150° C. When the expanding magnification is less than 20 times, the easiness of peeling the top layer may deteriorate. When the expanding magnification is more than 100 times, the heating temperature and time needed to obtain the easiness of peeling the top layer may increase. On the other hand, when the expanding start temperature is less than 90° C., the volume expansion of the microspheres may start when the laminate is used under hot whether conditions, for example, under the scorching sun in the middle of summer. When the expanding start temperature is more than 150° C., the heating temperature and time needed to obtain the easiness of peeling may increase. Therefore, when the expanding magnification and the expanding start temperature of the microspheres are within the above ranges, it is possible to efficiently perform recycling of the laminate.

In addition, it is preferred that a mean particle size of the microspheres is within a range of 3 $\mu$m to 30 $\mu$m, and more preferably 9 $\mu$m to 17 $\mu$m. When the average particle size is less than 3 $\mu$m, the easiness of peeling the top layer may deteriorate. In addition, when mixing the microspheres with the aqueous dispersion (A), there is a fear that the microspheres can not be dispersed uniformly in the adhesive. On the other hand, when the mean particle size is more than 30 $\mu$m, the distribution of the microspheres in the adhesive may make large amount of grits. In such a case, the easiness of peeling will be down.

When using an acrylic polymer not containing chlorine compound as a material for the microspheres, there are advantages that no dioxine is generated, and the microspheres are excellent in compatibility with the ethylene-vinyl acetate copolymer (EVAc) emulsion and in thermal expansion capability. In addition, it is preferred to use commercial microspheres having thermal expansion capability, e.g., EXPANCEL 053DU (manufactured by EXPANCEL/Akzo Nobel, Expanding Magnification: 35 times, Expanding Start Temperature: 101° C.).

It is preferred that a compounding amount of the microspheres is in a range of 2 to 100 parts by weight, and particularly 5 to 75 parts by weight, with respect to 100 parts by weight of solid content of polymer in the aqueous dispersion (A). In the case of using the mixture of ethylene-vinyl acetate copolymer (EVAc) and the anionic polyurethane dispersion, it is preferred that a compounding amount of the microspheres is in a range of 2 to 100 parts by weight, and particularly 5 to 75 parts by weight, with respect to 100 parts by weight of solids content of total polymer in the ethylene-vinyl acetate copolymer and the anionic polyurethane dispersion. When the compounding amount is less than 2 parts by weight, the easiness of peeling the top layer may deteriorate. When the compounding amount is more than 100 parts by weight, reductions in water resistance and in bonding strength of the laminate may occur. In addition, the use of excessive amounts of the microspheres will lead to a decrease in cost performance. When the compounding amount is within the range of 5 to 75 parts by weight, there is an advantage that the bonding layer can successfully follow the volume expansion of the microspheres.

When the laminate of the present invention is used in application fields such as cladding panels, which need excellent water resistance, heat resistance, and boiling resistance, a crosslinker such as polyisocyanate compound or epoxy compound may be added to the adhesive of the present invention.

By adding the microspheres having thermal expansion capability to the ethylene-vinyl acetate copolymer emulsion, and if necessary the anionic polyurethane dispersion with required compounding amounts, and stirring a resultant mixture in a conventional pot, the adhesive used to form the laminate of the present invention can be obtained. If necessary, the adhesive may contain thickeners, pH control agents, fillers, solvents such as toluene or xylene, plasticizer, defoaming agents, or anti-mildew agents.

A laminated board of the present invention, which is composed of a porous board (substrate), a plastic sheet (top layer) and a bonding layer therebetween, can be produced by the following method with use of a conventional laminating machine. That is, the adhesive described above is uniformly applied on the porous board such as plasterboard by means of a spreader roll coating or a nozzle coating to obtain an applied layer of the adhesive thereon. Then, the plastic sheet is placed on the applied layer, and kept for a required time under a pressure. After the pressure is removed, the resultant laminate is dried to obtain the laminated board of the present invention. This laminated board can be widely used as housing materials such as door boards and frames for kitchen, interior door, closet, shoe box, or washstand, or the other building materials.

In addition, a laminated board of the present invention, which is composed of a porous board (substrate), a metal plate or board (top layer) and a bonding layer therebetween, can be produced by the following method with use of an existing production line of building materials factory. That is, the adhesive described above is uniformly applied on the porous board such as plasterboard by means of a spreader roll coating or a nozzle coating to obtain an applied layer of the adhesive thereon. Then, the metal plate or board is placed on the applied layer, and kept for a required time under a pressing process. After the pressing process, a resultant laminate is left for a predetermined time period under an air-drying condition to obtain the laminate board of the present invention. This laminated board is preferably used as bathroom materials such as wall panel or ceiling board.

Prior to the step of bonding the metal layer to the porous board, a protection layer such as an epoxy coat or a PVC coat may be formed on a bottom surface (a surface facing the porous board) of the metal plate. In addition, a decoration layer such as a resin coat may be formed on a top surface (outer surface) of the metal plate. The metal plate with the decoration layer is usually called as "a decorated metal plate". The adhesive may be applied on the bottom surface of the metal plate, or on both surfaces of the metal plate and porous board.

The present invention also provides a method of easily peeling off the top layer from the laminate described above. That is, this method comprises the steps of irradiating the laminate with a light, while heating the laminate. As the light to be irradiated, it is preferred to use ultraviolet and far infrared. In particular, it is preferred to use far infrared having a wavelength of 5 to 30 $\mu$m.

To readily peel off the top layer from the laminate with efficiency, it is preferred to irradiate the laminate with far infrared for 2 minutes or more, while heating the laminate at 150° C. or more. The peeling method of the present invention can be carried out by use of a furnace having a far-infrared irradiation unit and a conveyer system of conveying the laminate to be treated into a heating zone of the furnace. In this case, for example, the conveyer system is controlled so as to allow the laminate to pass through the heating zone for 2 minutes. A temperature of the heating zone is 150° C. The irradiation unit irradiates far infrared having the wavelength of 5 to 30 $\mu$m to the laminate that is passing through the heating zone. The irradiation of far infrared is performed to the top layer of the laminate. When the laminate comes out from the furnace, the top layer can peel off from the laminate by itself. At this time, there is no adhesion of a residue of the bonding layer to the peeled top layer. Thus, since the top layer can be easily peeled off from the laminate within a very short time, the peeling method of the present invention is effective to improve the efficiency of recycling the laminate after use.

Alternatively the peeling method of the present invention may be carried out by use of a furnace having an ultraviolet irradiation unit and the conveyer system described above. In this case, for example, the conveyer system is controlled so as to allow the laminate to pass through the heating zone for 10 minutes. A temperature of the heating zone is 150° C. The irradiation unit irradiates ultraviolet to the laminate that is passing through the heating zone. When the laminate comes out from the furnace, the top layer can peel off from the laminate by itself. Moreover, it is possible to prevent the adhesion of a residue of the bonding layer to the peeled top layer.

As described above, the irradiation of ultraviolet or far infrared is effective to efficiently carry out the recycling operation of the laminate. However, if it is permitted to extend the treatment time, the top layer may be peeled off by only heating the laminate for the extended time, without the irradiation of ultraviolet or far infrared. For example, a conventional furnace such as a hot-air circulating apparatus can be used. When the heating temperature is 150° C., it will be necessary to keep the laminate at the temperature for 20 minutes to about 1 hour. In addition, when the heating temperature is 120° C., it will be necessary to keep the laminate at the temperature for at least 1 hour. As the heating means, an infrared furnace may be used.

When it is needed to prevent adhesion of the residue of the bonding layer to the peeled top layer, it is preferred that a surface-roughing treatment such as sandblasting is performed to a top surface facing the top layer of the substrate at the production of the laminate. Since the bonding strength between the substrate and the top layer is improved by an anchor effect, it becomes difficult for the bonding layer to peel off from the substrate.

EXAMPLES

The following is preferred examples of the present invention. However, the present invention is not limited to these Examples.

(1) EVA(1)

An aqueous solution of polyvinyl-alcohol was put in a high pressure-polymerization apparatus such that a content of polyvinyl alcohol is 5 wt % with respect to the total polymer used. After a required amount of ethylene gas was supplied into the apparatus, a mixed solution of vinyl acetate and the multifunctional monomer was dropped into the aqueous solution of polyvinyl alcohol. Next, an emulsion polymerization of the resultant mixture was performed at a temperature of 50 to 70° C. under a pressure to obtain a copolymer emulsion of polyvinyl alcohol containing ethylene-vinyl acetate-multifunctional monomer, which is used as the aqueous dispersion (A) of the adhesive of the present invention.

In this example, triallyl isocyanurate was used as the multifunctional monomer. A weight ratio of ethylene/vinyl acetate is 17/83, and the weight ratio of multifunctional monomer/vinyl acetate is 0.1/100. A toluene insoluble fraction of a dried film of the copolymer emulsion is 92.5 wt %. A viscosity of the copolymer emulsion is 2000 mPa·s/25° C. A pH value of the copolymer emulsion is 4.6. A solid content in the copolymer emulsion is 55.3 wt %. Tensile strength and percentage elongation of the dried film of the copolymer emulsion are 9.8 MPa and 700%, respectively. Hereinafter, this copolymer emulsion is named as EVA (1).

(2) EVA(2)

A copolymer emulsion of polyvinyl alcohol containing ethylene-vinyl acetate-multifunctional monomer was obtained by a substantially same method as the case of EVA(1) except that the weight ratio of multifunctional monomer/vinyl acetate is 0.07/100. A toluene insoluble fraction of a dried film of the copolymer emulsion is 75.5 wt %. A viscosity of the copolymer emulsion is 200 mPa·s/25° C. A solid content in the copolymer emulsion is 55.0 wt %. A pH value of the copolymer emulsion is 4.5. Tensile strength and percentage elongation of the dried film of the copolymer emulsion are 9.5 MPa and 710%, respectively. Hereinafter, this copolymer emulsion is named as EVA (2).

(3) SF467

As a commercial ethylene-vinyl acetate copolymer emulsion, "SUMIKAFLEX 467" (manufactured by Sumitomo Chemical Co., Ltd.) was used. A toluene insoluble fraction of a dried film of the copolymer emulsion is 29 wt %. A solid content in the copolymer emulsion is 65.0 wt %. A pH value of the copolymer emulsion is 5. Tensile strength and percentage elongation of the dried film of the copolymer emulsion are 4.0 MPa and 770%, respectively. Hereinafter, this copolymer emulsion is named as SF467.

(4) OM4000

As a commercial ethylene-vinyl acetate copolymer emulsion, "KURARAY OM-4000" (manufactured by KURARAY CO., LTD.) was used. A solid content in the copolymer emulsion is 56.0 wt %. A pH value of the copolymer emulsion is 5. Tensile strength and percentage elongation of the dried film of the copolymer emulsion are 4.0 MPa and 1000%, respectively. Hereinafter, this copolymer emulsion is named as OM4000.

(5) OM3100

As a commercial ethylene-vinyl acetate copolymer emulsion, "KURARAY OM-3100" (manufactured by KURARAY CO., LTD.) was used. A solid content in the copolymer emulsion is 56.0 wt %. A pH value of the copolymer emulsion is 5. Tensile strength and percentage elongation of the dried film of the copolymer emulsion are 1.5 MPa and 3000%, respectively. Hereinafter, this copolymer emulsion is named as OM3100.

(6) SF480

As a commercial ethylene-vinyl acetate copolymer emulsion, "SUMIKAFLEX 480" (manufactured by Sumitomo Chemical Co., Ltd.) was used. A pH value of the copolymer emulsion is 5. A solid content in the copolymer emulsion is 55.0 wt %. Tensile strength and percentage elongation of the dried film of the copolymer emulsion are 29.0 MPa and 0%, respectively. Hereinafter, this copolymer emulsion is named as SF480.

(7) SF400

As a commercial ethylene-vinyl acetate copolymer emulsion, "SUMIKAFLEX 400" (manufactured by Sumitomo Chemical Co., Ltd.) was used. A solid content in the copolymer emulsion is 55.0 wt %. A pH value of the copolymer emulsion is 5. Tensile strength and percentage elongation of the dried film of the copolymer emulsion are 7.4 MPa and 520%, respectively. Hereinafter, this copolymer emulsion is named as SF400.

(8) S-PU

The used anionic polyurethane dispersion has the aromatic structure, polyester structure, and sulfonate group in its polymer. A solid content in the polyurethane dispersion is 45.0 wt %. A pH value of the polyurethane dispersion is approximately 8. Hereinafter, this polyurethane dispersion is named as S-PU.

(9) EX053

As microspheres having thermal expansion capability, each of which is composed of a polymer shell encapsulating a gas, EXPANCEL 053DU (manufactured by EXPANCEL/Akzo Nobel) was used. The microspheres have properties of an expanding magnification of 35 times, and an expanding start temperature. of 101° C. Hereinafter, the microspheres having thermal expansion capability are named as EX053.

Examples 1–5 and Comparative Examples 1–2

According to compounding amounts listed in Table 1, EVA(1), EVA(2), SF467, EX053 and S-PU were mixed to obtain the adhesives of Examples 1–5 and Comparative Examples 1–2.

In each of Examples 1–5 and Comparative Examples 1–2, a laminated board with a plastic top layer was produced by using the obtained adhesive. That is, a lauan plywood having a thickness of 3.0 mm, which complies with Class 1 of the Japanese Agricultural Standard (JAS), was used as the substrate. The adhesive was applied uniformly on the top surface of the lauan plywood by use of a rubber roll. An amount used of the adhesive is 110 g/m². Then, a decorated sheet of polyethylene terephthalate was placed as the plastic top layer on the applied surface of the lauan plywood. A thickness of the decorated sheet is 0.08 mm. The resultant laminate was kept at 22° C. for 1 hour under a pressure of 0.2 MPa. After the pressure is removed, the laminate was dried at 22° C. for five days to obtain the laminated board with the plastic top layer.

The following performance evaluations were conducted for the laminated board with the plastic top layer.

(1) Immersion Test

A immersion test for evaluating a bonding strength of the plastic top layer was performed according to a method as set forth in Class 2 of the JAS (Japanese Agricultural Standard). That is, the laminated board with the plastic top layer was cut to obtain a test piece having a square shape of 75 mm×75 mm. The test piece was dipped in water at 70° C. for 2 hours. After the test piece was dried for 3 hours in a constant temperature device kept at 60° C., a peel length of the plastic top layer was measured and evaluated. Results are shown in Table 1. In Table 1, the symbol "○" designates that there was no peeling. The symbol "Δ" designates that the peel length is 25 mm or less. The symbol "x" designates that the peel length is more than 25 mm.

(2) Heat Creep Test

A heat creep test for evaluating heat creep resistance of the laminated board with the plastic top layer at temperatures of 60° C. and 70° C. was performed according to the following method. That is, the laminated board with the plastic top layer was cut to obtain a test piece having a rectangular shape of 25 mm wide×200 mm length. The plastic top layer was peeled off from an edge of the test piece by only a distance of 50 mm in the length direction. Then test piece was put in a constant temperature device kept at 60° C. or 70° C. such that the test piece is placed horizontally, and the peeled part of the plastic top layer hangs from the test piece in a vertical direction. The test piece was kept for 1 hour under this condition. In addition, the test piece was kept in the constant temperature device for another 1 hour under the condition that a weight of 500 g was loaded to a free end of the peeled part of the plastic top layer, and then an increase in peel length of the plastic top layer was measured. As the increase in the peel length is smaller, it means that the heat creep resistance is better. Results are shown in Table 1.

(3) Peeling Test with Far Infrared Irradiation

A peeling test for evaluating easiness of peeling of the plastic top layer after irradiating far infrared to the laminated board with the plastic top layer under a heating condition, while heating was performed according to the following method. That is, the laminated board with the plastic top layer was cut to obtain a test piece having a square shape of 150 mm×150 mm. To irradiate the test piece with far infrared, while heating, a far-infrared irradiation apparatus "MINI-JET MJS-200" (manufactured by JARD, INC) was used. The peeling test was performed at three different temperatures, i.e., 120° C., 150° C. and 200° C. The irradiation time of far infrared is 2 minutes. After the irradiation was finished, a peeling status of the plastic top layer was evaluated. Results are shown in Table 1.

In Table 1, the symbol "⊚" designates that the plastic top layer can peel off by itself, and even after cooling, the plastic top layer can be easily peeled off without leaving a residue of the bonding layer on the peeled plastic top layer. The symbol "○" designates that the plastic top layer can not peel off by itself, however, the plastic top layer can be easily peeled without adhesion of a residue of the bonding layer to the peeled plastic top layer. The symbol "Δ" designates that the plastic top layer can not peel off by itself, however, the plastic top layer can be easily peeled off immediately after the irradiation without adhesion of a residue of the bonding layer to the peeled plastic top layer, and when the plastic top layer is peeled off after cooling, a breakage of the laminated board may occur. The symbol "x" designates that the plastic top layer can not peel off by itself, and when the plastic top layer is peeled off immediately after the irradiation, a residue of the bonding layer leaves on the peeled plastic top layer, and when the plastic top layer is peeled off after cooling, a considerable breakage of the laminated board occurs. The symbol "x x" designates that the plastic top layer can not peel off by itself, and even when the plastic top layer is peeled off immediately after the irradiation, a considerable breakage of the laminated board occurs.

(4) Peeling Test with Ultraviolet Irradiation

A peeling test for evaluating easiness of peeling of the plastic top layer after irradiating ultraviolet to the laminated board with the plastic top layer under a heating condition was performed according to the following method. That is, the laminated board with the plastic top layer was cut to obtain a test piece having a square shape of 150 mm×150 mm. To irradiate the test piece with ultraviolet, while heating, an ultraviolet irradiation apparatus "PANA CURE NUX7328F-467" (manufactured by Matsushita Electric Works, Ltd.) was used. The peeling test was performed at 150° C. The irradiation time of ultraviolet is 10 minutes. After the irradiation was finished, a peeling status of the plastic top layer was evaluated according to the evaluation standards set forth in the above peeling test with far infrared irradiation. Results are shown in Table 1.

(5) Peeling Test with Hot Air

The peeling test for evaluating easiness of peeling of the plastic top layer after heating the laminated board with the plastic top layer by hot air without light irradiation was performed according to the following method. That is, the laminated board with the plastic top layer was cut to obtain a test piece having a square shape of 150 mm×150 mm. To heat the test piece with the hot air, a hot-air circulating apparatus "HISPEC HT210" (manufactured by KUSUMOTO CHEMICALS LTD.) was used. The peeling test was performed at 150° C. for each of two different heating times, i.e., 20 minutes and 24 hours. After the heat treatment, a peeling status of the plastic top layer was evaluated according to the evaluation standards set forth in the above peeling test with far infrared irradiation. Results are shown in Table 1.

(Results)

As understood from the results of Table 1, the laminated board with the plastic top layer of each of the Examples 1–3 is lower in heat creep resistance and bonding strength, as compared with Comparative Examples. However, those properties of the laminated boards of Examples 1–3 are enough to use them for building materials for interior decoration, which do not need high endurance. On the other hand, the laminated boards of Examples 1–3 are excellent in easiness of peeling the plastic top layer, in other words, easiness of recycling the laminated board after use. Particularly, in the Examples 2 and 3, when irradiating far infrared or ultraviolet to the laminated board at the heating temperature of 150 or 200° C., the plastic top layer can peel off from the laminated board by itself. In this case, peeling occurs at the interface between the plastic top layer and the bonding layer on the substrate, without adhesion of a residue of the bonding layer to the peeled plastic top layer.

The laminated board of each of the Examples 4 and 5, which was produced by use of the adhesive containing the anionic polyurethane dispersion (S-PU) in addition to the EVAc emulsion, demonstrates good heat creep resistance and bonding strength. Therefore, these laminated boards can be used in applications that need high heat resistance, for example, building materials for window frame. In addition, as in the case of the Examples 2 and 3, the easiness of peeling the plastic top layer is obtained in the laminated board of the Example 5 by the ultraviolet or far-infrared irradiation. Moreover, when the irradiation time of far infrared is extended to 10 min at the heating temperature of 120° C., it has been confirmed that the easiness of peeling can be improved from the level "Δ" to the level "○". The results of the peeling test with hot air show that the plastic top layer can be peeled off by only heating the laminated board for an extended time without light irradiation.

In the comparative Examples 1 and 2, since the adhesive does not contain the microspheres having thermal expansion capability (EX053) that are an essential component of the present invention, it was very difficult to peel off the plastic top layer from the laminated board. When the plastic top layer was forcedly peeled off from the laminate, a considerable breakage of the laminate board occurred.

Examples 6–11 and Comparative Examples 3–4

According to compounding amounts listed in Table 2, EVA(1), SF400, OM4000, OM3100, SF480, EX053 and S-PU were mixed to obtain the adhesives of Examples 6–11 and Comparative Examples 3–4.

In each of Examples 6–11 and Comparative Examples 3–4, a laminated board with a metal top layer was produced by using the obtained adhesive. That is, a plasterboard having a thickness of 12 mm was used as the substrate. The adhesive was applied uniformly on the top surface of the plasterboard by use of a rubber roll. A coating amount of the adhesive is 110 g/m². Then, a decorated steel plate with a thickness of 1.0 mm was placed as the metal top layer on the applied surface of the plasterboard. An anti-corrosive treatment was previously performed to a surface facing the plasterboard of the decorated steel plate by use of phosphoric acid. The resultant laminate was kept at 22° C. for 1 hour under a pressure of 0.5 MPa. After the pressure is removed, the laminate was dried at 22° C. for five days to obtain the laminated board with the metal top layer.

The following performance evaluations were conducted for the laminated board with the plastic top layer.

(1) Tensile Test at Room Temperature

A tensile test for evaluating a bonding strength of the metal top layer at room temperature was performed according to the following method. That is, the laminated board with the metal top layer was cut to obtain a test piece having a square shape of 25 mm×25 mm. The test piece was set at a tensile test apparatus "AUTOGRAPH AG-5000A (manufactured by Shimadzu Corporation), and then submitted to the tensile test at a test speed of 50 mm/min at the temperature of 22° C. to measure the bonding strength. Results are shown in Table 2.

(2) Tensile Test under Wet Heat Condition

A tensile test for evaluating a bonding strength of the metal top layer after exposure to a wet heat condition was performed according to the following method. That is, the laminated board with the metal top layer was cut to obtain a test piece having a square shape of 25 mm×25 mm. The test piece was kept for 48 hours in the atmosphere of 40° C., 90% RH. Then, the test piece was set at the tensile test apparatus "AUTOGRAPH AG-5000A", and submitted to the tensile test at a test speed of 50 mm/min to measure the bonding strength. Results are shown in Table 2.

(3) Peeling Test with Far Infrared Irradiation

A peeling test for evaluating easiness of peeling the metal top layer after irradiating far infrared to the laminated board with the metal top layer under a heating condition was performed according to the following method. That is, the laminated board with the metal top layer was cut to obtain a test piece having a square shape of 150 mm×150 mm. To irradiate the test piece with far infrared, while heating, a far-infrared irradiation apparatus "MINI-JET MJS-200" was used. The peeling test was performed at three different temperatures, i.e., 120° C., 150° C. and 180° C. The irradiation time of far infrared is 2 minutes. After the irradiation was finished, a peeling status of the plastic top layer was evaluated. Results are shown in Table 2.

In Table 2, the symbol "⊙" designates that the metal top layer can peel off by itself, and even after cooling, the metal top layer can be easily peeled off without adhesion of a residue of the bonding layer to the peeled metal top layer. The symbol "○" designates that the metal top layer can not peel off by itself, however, the metal top layer can be easily peeled off without adhesion of a residue of the bonding layer to the peeled metal top layer. The symbol "Δ" designates that the metal top layer can not peel off by itself, however, the metal top layer can be easily peeled off immediately after the irradiation without adhesion of a residue of the bonding layer to the peeled metal top layer, and on the other hand when the metal top layer is peeled off after cooling, a rip of the plasterboard may occur. The symbol "x" designates that the metal top layer can not peel off by itself, and when the metal top layer is peeled off immediately after the irradiation, a residue of the bonding layer leaves on the peeled metal top layer, and when the metal top layer is peeled off after cooling, a considerable breakage of the laminated board occurs. The symbol "x x" designates that the metal top layer can not peel off by itself, and even when the metal top layer is peeled off immediately after the irradiation, a considerable breakage of the laminated board occurs.

(4) Peeling Test with Ultraviolet Irradiation

A peeling test for evaluating easiness of peeling of the metal top layer after irradiating ultraviolet to the laminated board with the metal top layer under a heating condition was performed according to the following method. That is, the laminated board with the metal top layer was cut to obtain a test piece having a square shape of 150 mm×150 mm. To irradiate the test piece with ultraviolet, while heating, an ultraviolet irradiation apparatus "PANA CURE NUX7328F-467" was used. The peeling test was performed at 150° C. The irradiation time of ultraviolet is 10 minutes. After the irradiation, a peeling status of the metal top layer was evaluated according to the evaluation standards set forth in the above peeling test with far infrared irradiation. Results are shown in Table 2.

(5) Peeling Test with Hot Air

A peeling test for evaluating easiness of peeling of the metal top layer after heating the laminated board with the metal top layer by hot air without light irradiation was performed according to the following method. That is, the laminated board with the metal was cut to obtain a test piece having a square shape of 150 mm×150 mm. To heat the test piece with the hot air, a hot-air circulating apparatus "HISPEC HT210" was used. The peeling test was performed at 150° C. for two different heating times, i.e., 20 minutes and 24 hours. After the heat treatment, a peeling status of the metal top layer was evaluated according to evaluation standards set forth in the above peeling test with far infrared irradiation. Results are shown in Table 2.

(Results)

As shown in Table 2, the bonding strength of the laminated board of each of Examples 6–11 is enough for practical use as building materials that need high endurance. In addition, the use of the adhesive containing both of the anionic polyurethane dispersion (S-PU) and the ethylene-vinyl acetate copolymer (EVAc) emulsion is effective to further improve the bonding strength (Examples 5, 6). In particular, when using the combination of the anionic polyurethane dispersion (S-PU) and the ethylene-vinyl acetate copolymer emulsion (EVA(1)), which is characterized in that a toluene insoluble fraction of a dried film of the copolymer emulsion is 70 wt % or more, it is possible to remarkably improve the bonding strength (Example 6).

On the other hand, the laminated boards of Examples 6–11 are excellent in easiness of peeling the metal top layer. That is, when irradiating far infrared or ultraviolet to the laminated board at the heating temperature of 150 or 180° C., the metal top layer can peel off from the laminated board by itself. In this case, peeling occurs at the interface between the metal top layer and the bonding layer on the substrate, without adhesion of a residue of the bonding layer to the peeled metal top layer.

When the irradiation time of far infrared is extended to 10 min at the heating temperature of 120° C., it has been confirmed that the easiness of peeling can be improved from the level "Δ" to the level "○". The results of the peeling test with hot air show that the plastic top layer can be peeled off by only heating the laminated board for an extended time without light irradiation.

In the comparative Examples 3 and 4, since the tensile strength or the percentage elongation of the EVAc emulsion of the adhesive is out of the range of the present invention, the easiness of peeling the metal top layer was poor. Thus, these experimental results showing the difference between the Examples 6–11 of the present invention and the Comparative Examples 3–4, with respect of the easiness of peeling, proves importance of the ranges of the tensile strength and the percentage elongation defined in claim 1.

Examples 12–17 and Comparative Examples 5–6

According to compounding amounts listed in Table 3, EVA(1), SF400, OM4000, OM3100, SF480, EX053 and S-PU were mixed to obtain the adhesives of Examples 12–17 and Comparative Examples 5–6.

In each of Examples 12–17 and Comparative Examples 5–6, a laminated board with a metal top layer was produced by using the obtained adhesive. That is, a plywood having a thickness of 10 mm was used as the substrate. The adhesive was applied uniformly on the top surface of the plywood by use of a rubber roll coater. A coating amount of the adhesive is 150 g/m². Then, a decorated steel plate having a thickness of 1.0 mm was placed as the metal top layer on the applied surface of the plywood. An epoxy coating was previously performed to a surface facing the plywood of the decorated steel plate. The resultant laminate was kept at 22° C. for 3 hours under a pressure of 0.5 MPa. After the pressure is removed, the laminate was dried at 22° C. for five days to obtain the laminated board with the metal top layer.

The following performance evaluations were conducted for the laminated board with the metal top layer.

(1) Tensile Test at Room Temperature

A tensile test for evaluating a bonding strength of the metal top layer at room temperature was performed according to the same method as set forth in Examples 6–11. Results are shown in Table 2.

(2) Tensile Test under Wet Condition

A tensile test for evaluating a bonding strength of the metal top layer under a wet condition was performed according to the following method. That is, the laminated board with the metal top layer was cut to obtain a test piece having a square shape of 25 mm×25 mm. The test piece was dipped in water at 23° C. for 3 hours. Immediately after the dip treatment, the test piece that got wet was set at the tensile test apparatus "AUTOGRAPH AG-5000A", and submitted to the tensile test at a test speed of 5 mm/min to measure the bonding strength. Results are shown in Table 3.

(3) Peeling Test with Far Infrared Irradiation

A peeling test for evaluating easiness of peeling of the metal top layer after irradiating far infrared to the laminated board with the metal top layer under a heating condition was performed according to the substantially same method as set forth in Examples 6–11 except that far infrared was irradiated to the test piece at 150° C. for 2 minutes. Results are shown in Table 3.

(Results)

As shown in Table 3, the bonding strength of the laminated board of each of Examples 12–17 is enough for practical use as building materials. In addition, the use of the adhesive containing both of the anionic polyurethane dispersion (S-PU) and the ethylene-vinyl acetate copolymer (EVAc) emulsion is effective to further improve the bonding strength (Examples 16, 17). In particular, when using the combination of the anionic polyurethane dispersion (S-PU) and the EVAc emulsion (EVA(1)), which is characterized in that a toluene insoluble fraction of a dried film of the copolymer emulsion is 70 wt % or more, it is possible to provide a remarkably improved bonding strength (Example 17), even when the epoxy-coated surface of the decorated steel plate is bonded to the plywood for concrete panel.

On the other hand, the laminated boards of Examples 12–17 are excellent in the easiness of peeling the metal top layer. That is, when irradiating far infrared to the laminated board at the heating temperature of 150° C., the metal top layer can peel off from the laminated board by itself. In this case, peeling occurs at the interface between the metal top layer and the bonding layer on the substrate, without adhesion of a residue of the bonding layer to the peeled metal top layer.

In the comparative Examples 5 and 6, since the tensile strength or the percentage elongation of the EVAc emulsion in the adhesive is out of the range of the present invention, the easiness of peeling the metal top layer was poor.

As understood from the above-described Examples, the laminate of the present invention that is excellent in bonding strength, heat creep resistance, and water resistance, is expected as building materials that can survive severe use environments. In addition, since the top layer can be easily peeled off from the laminate in a short time by irradiating the laminate with far infrared or ultraviolet, while heating, the laminate of the present invention having easiness of recycling after use is also expected as an environmentally friendly building material. Moreover, the easiness of peeling is effective to reduce adhesion failure at the lamination process, and improve yields up of the laminate.

TABLE 1

| | | EXAMPLE | | | | | COMPARATIVE EXAMPLE | |
|---|---|---|---|---|---|---|---|---|
| | | 1 | 2 | 3 | 4 | 5 | 1 | 2 |
| Ethylene-Vinyl Acetate Copolymer (EVAc) Emulsion (parts by weight) | SF467 | 100 | — | — | 80 | — | 80 | — |
| | EVA(1) | — | 100 | — | — | 80 | — | 100 |
| | EVA(2) | — | — | 100 | — | — | — | — |
| Anionic Polyurethane Dispersion (parts by weight) | S-PU | — | — | — | 20 | 20 | 20 | — |
| Microspheres with Thermal-Expansion Capability (parts by weight) | EX053 | 30 | 20 | 30 | 40 | 40 | — | — |
| Dried Film of EVAc Emulsion | Tensile strength (MPa) | 4.0 | 9.8 | 9.5 | 6.8 | 12.6 | 6.8 | 9.8 |
| | Percentage Elongation (%) | 770 | 700 | 710 | 990 | 900 | 990 | 700 |
| Dipping Test | | △ | ○ | △ | ○ | ○ | ○ | ○ |
| Heat Creep Test (mm/1 h) | 60° C. | 30 | 20 | 22 | 0 | 0 | 0 | 13 |
| | 70° C. | 100< | 100< | 100< | 0 | 0 | 2 | 79 |
| Peeling Test (Far Infrared Irradiation) | 120° C. | △ | △ | △ | △ | △ | x x | x x |
| | 150° C. | ○ | ◎ | ◎ | ○ | ◎ | x x | x x |
| | 200° C. | ○ | ◎ | ◎ | ○ | ◎ | x x | x x |
| Peeling Test (Ultraviolet Irradiation) | 150° C. | ○ | ◎ | ◎ | ○ | ◎ | x x | x x |
| Peeling Test (Hot Air) | 150° C. × 20 min | △ | △ | △ | △ | △ | x x | x x |
| | 150° C. × 24 hours | △ | △ | △ | △ | △ | x x | △ |

TABLE 2

| | | EXAMPLE | | | | | | COMPARATIVE EXAMPLE | |
|---|---|---|---|---|---|---|---|---|---|
| | | 6 | 7 | 8 | 9 | 10 | 11 | 3 | 4 |
| Ethylene-Vinyl Acetate Copolymer (EVAc) Emulsion (parts by weight) | SF400 | 100 | 100 | — | — | 85 | — | — | — |
| | OM4000 | — | — | 100 | — | — | — | — | — |
| | EVA(1) | — | — | — | 100 | — | 90 | — | — |
| | OM3100 | — | — | — | — | — | — | 100 | — |
| | SF480 | — | — | — | — | — | — | — | 100 |
| Anionic Polyurethane Dispersion (parts by weight) | S-PU | — | — | — | — | 15 | 10 | — | — |
| Microspheres with Thermal-Expansion Capability (parts by weight) | EX053 | 30 | 60 | 30 | 30 | 30 | 30 | 60 | 60 |
| Dried Film of EVAc Emulsion | Tensile strength (MPa) | 7.4 | 7.4 | 4.0 | 9.8 | 10.7 | 11.8 | 1.5 | 29.0 |
| | Percentage Elongation (%) | 520 | 520 | 1000 | 700 | 540 | 850 | 3000< | 0 |
| Bonding Strength (Room Temperature) (N/cm²) | | 74 | 70 | 75 | 74 | 79 | 81 | 60 | 70 |
| Bonding Strength (Wet Heat Condition) (N/cm²) | | 60 | 57 | 60 | 65 | 67 | 75 | 49 | 64 |
| Peeling Test (Far Infrared Irradiation) | 120° C. | △ | △ | △ | △ | △ | △ | x | x x |
| | 150° C. | ◎ | ◎ | ◎ | ◎ | ◎ | ◎ | △ | x x |
| | 180° C. | ◎ | ◎ | ◎ | ◎ | ◎ | ◎ | △ | x x |
| Peeling Test (Ultraviolet Irradiation) | 150° C. | ◎ | ◎ | ◎ | ◎ | ◎ | ◎ | △ | x x |
| Peeling Test (Hot Air) | 150° C. × 20 min | △ | △ | △ | △ | △ | △ | x x | x x |
| | 150° C. × 24 hours | △ | △ | △ | △ | △ | △ | x x | x x |

TABLE 3

| | | EXAMPLE | | | | | | COMPARATIVE EXAMPLE | |
|---|---|---|---|---|---|---|---|---|---|
| | | 12 | 13 | 14 | 15 | 16 | 17 | 5 | 6 |
| Ethylene-Vinyl Acetate Copolymer (EVAc) Emulsion (parts by weight) | SF400 | 100 | 100 | — | — | 85 | — | — | — |
| | OM4000 | — | — | 100 | — | — | — | — | — |
| | EVA(1) | — | — | — | 100 | — | 90 | — | — |
| | OM3100 | — | — | — | — | — | — | 100 | — |
| | SF480 | — | — | — | — | — | — | — | 100 |

TABLE 3-continued

|  |  | EXAMPLE | | | | | | COMPARATIVE EXAMPLE | |
| --- | --- | --- | --- | --- | --- | --- | --- | --- | --- |
|  |  | 12 | 13 | 14 | 15 | 16 | 17 | 5 | 6 |
| Anionic Polyurethane Dispersion (parts by weight) | S-PU | — | — | — | — | 15 | 10 | — | — |
| Microspheres with Thermal-Expansion Capability (parts by weight) | EX053 | 30 | 60 | 30 | 30 | 30 | 30 | 60 | 60 |
| Dried Film of EVAc Emulsion | Tensile strength (MPa) | 7.4 | 7.4 | 4.0 | 9.8 | 10.7 | 11.8 | 1.5 | 29.0 |
|  | Percentage Elongation (%) | 520 | 520 | 1000 | 700 | 540 | 850 | 3000< | 0 |
| Bonding Strength (Room Temperature) (N/mm²) |  | 1.0 | 1.0 | 1.1 | 1.2 | 1.3 | 1.4 | 1.0 | 1.2 |
| Bonding Strength (Wet Heat Condition) (N/mm²) |  | 0.2 | 0.2 | 0.2 | 0.4 | 0.6 | 0.7 | 0.1 | 0.3 |
| Peeling Test (Far Infrared Irradiation) | 150° C. | ◎ | ◎ | ◎ | ◎ | ◎ | ◎ | Δ | x x |

What is claimed is:

1. A laminate comprising a peelable plastic top layer, a substrate, and a bonding layer between said top layer and said substrate,
    wherein said substrate is porous and
    an adhesive for forming said bonding layer comprises the following components:
    (A) an aqueous dispersion containing a polymer, which has properties that a dried film of said aqueous dispersion has a tensile strength of 1 to 28 MPa and a percentage elongation of 100 to 2000%; and
    (B) a water-based adhesive composition comprising microspheres with thermal expansion capability, each of which comprises a polymer shell encapsulating a gas,
    wherein said laminate has a property that upon heating, said microspheres increase in volume, thereby facilitating peelability of said top layer from said laminate.

2. The laminate as set forth in claim 1, wherein said aqueous dispersion (A) comprises at least one selected from the group consisting of vinyl acetate polymer or copolymer, urethane polymer, acrylic polymer or copolymer, silicone polymer, chloroprene elastomer, and styrene-butadiene elastomer.

3. The laminate as set forth in claim 1, wherein an amount of said microspheres is in a range of 2 to 100 parts by weight with respect to 100 parts by solid content of polymer in said aqueous dispersion (A).

4. The laminate as set forth in claim 1, wherein said microspheres have properties of an expanding magnification of 20 times to 100 times, and an expanding start temperature of 90° C. to 150° C.

5. The laminate as set forth in claim 1, wherein said aqueous dispersion (A) comprises an ethylene-vinyl acetate copolymer and an anionic polyurethane dispersion.

6. The laminate as set forth in claim 5, wherein the anionic polyurethane dispersion is an anionic polyurethane dispersion with sulfonate groups.

7. The laminate as set forth in claim 5, wherein an amount of said microspheres is in a range of 2 to 100 parts by weight with respect to 100 parts by weight of solids content of total polymer in the ethylene-vinyl acetate copolymer and the anionic polyurethane dispersion.

8. The laminate as set forth in claim 1, wherein said aqueous dispersion (A) comprises an ethylene-vinyl acetate copolymer.

9. The laminate as set forth in claim 8, wherein a toluene insoluble fraction of a dried film of the ethylene-vinyl acetate copolymer is 70 wt % or more.

10. The laminate as set forth in claim 8, wherein a copolymerization ratio by weight of ethylene/vinyl acetate in said ethylene-vinyl acetate copolymer is in a range of about 5–35/95–65.

11. The laminate as set forth in claim 10, wherein said copolymerization ratio by weight is about 10–30/90–70.

12. The laminate as set forth in claim 1, wherein the peelable plastic top layer comprises a material selected from the group consisting of polyolefin, polyester, acrylic and melamine-formaldehyde resin.

13. The laminate as set forth in claim 12, wherein the peelable plastic top layer comprises polyethylene terephthalate.

14. A method of peeling off said top layer from said laminate as set forth in claim 1 comprising the step of irradiating said laminate with a light, while heating said laminate.

15. The method as set forth in claim 14, wherein said light is far infrared having a wavelength of 5 to 30 $\mu$m.

16. The method as set forth in claim 15, wherein said laminate is irradiated for 2 minutes or more with the far infrared, while being heated at a temperature of 150° C. or more.

17. The method as set forth in claim 14, wherein said light is ultraviolet.

* * * * *